United States Patent [19]

Shutterly

[11] 4,318,125

[45] Mar. 2, 1982

[54] SOLID STATE DIGITAL AUDIO SCRAMBLER SYSTEM FOR TELETRANSMISSION OF AUDIO INTELLIGENCE THROUGH A TELEVISION SYSTEM

[75] Inventor: Harold B. Shutterly, Pittsburgh, Pa.

[73] Assignee: Westinghouse Electric Corp., Pittsburgh, Pa.

[21] Appl. No.: 33,063

[22] Filed: Apr. 25, 1979

[51] Int. Cl.³ .................... H04N 7/16; H04K 7/04; H04N 7/04

[52] U.S. Cl. .................................. 358/121; 358/116; 358/145

[58] Field of Search ............... 358/116, 121, 145, 147; 179/1.5 R, 1.5 S

[56] References Cited

U.S. PATENT DOCUMENTS

| | | | |
|---|---|---|---|
| 3,313,880 | 4/1967 | Bass | 358/120 |
| 3,446,914 | 5/1969 | Hodge | 360/37 |
| 3,456,191 | 7/1969 | Rodenburg et al. | 325/2 |
| 3,559,068 | 5/1973 | Almering et al. | 325/50 |
| 3,736,369 | 5/1973 | Vogelman et al. | 358/115 |
| 3,773,977 | 11/1973 | Guanella | 179/1.5 S |
| 3,795,763 | 3/1974 | Golding et al. | 358/13 |
| 3,824,467 | 7/1974 | French | 325/32 |
| 3,902,007 | 8/1975 | Justice | 358/145 |
| 4,070,693 | 1/1978 | Shutterly | 358/122 |
| 4,156,253 | 5/1979 | Steudel | 358/145 |

*Primary Examiner*—Stephen C. Buczinski
*Attorney, Agent, or Firm*—C. M. Lorin

[57] ABSTRACT

An audio scrambler digitally samples a continuous audio signal, scrambles the derived samples and inserts at least one scrambled sample in the unoccupied region of the video signals of a video system for transmission line per line as an analog composite audio-video signal. A RAM device is used for this purpose which has the digital samples stored sequentially, then read at random. A special memory arrangement is used as a scratchpad in order to insure that while addressing the RAM at random there will be no repetition, nor omission of a particular address. Provision is made for the insertion of more than one sample per video line, in particular while transmitting severe audio signals on the same video system. The same technique is used at the receiver end for unscrambling the samples once extracted from the video lines.

4 Claims, 10 Drawing Figures

SOLID STATE DIGITAL AUDIO SCRAMBLER SYSTEM FOR TELETRANSMISSION OF AUDIO INTELLIGENCE THROUGH A TELEVISION SYSTEM

BACKGROUND OF THE INVENTION

The invention relates to encryption apparatus for audio communication through a television system. Audio security is as important as video security. With the advent of satellite links, private two-way audio channels that can be associated with a video channel are desirable, for instance for business teleconferences. Secure audio scramblers are already known for telephone lines. With video channels, however, advantage can be taken of the television system facilities to reduce the cost of scrambling the audio signal in particular by using the randomizing and synchronizing capability of video scramblers already present. Also, speech quality in the scrambling-descrambling process may be improved so as to exceed the telephone-line bandwidth. It is also important to allow for more than one audio system with the same installation.

It is known to scramble a digit stream as part of a video digital transmission system. See for instance "Digital Transmission Techniques" by G. M. Drury pp. 37-49 in IBA Technical Review (Great Britain) 1976 Vol. 9.

It is known from U.S. Pat. No. 3,958,077 of J. Ross et al. to generate pseudo-random numbers with digital shift registers. The patent also shows how to perform pseudo-random scanning in a television system.

In a scrambled television system, U.S. Pat. No. 3,717,206 of V. R. Zopf et al. shows that for subscription purposes coded signals have been associated with the transmitted video signals. This is also shown for unscrambling in U.S. Pat. No. 4,070,693 of H. B. Shutterly.

A pseudo-random generator is disclosed in U.S. Pat. No. 3,681,708 of M. E. Olmstead.

It is known from U.S. Pat. No. 3,105,114 of W. Koenig to divide into segments a signal and to introduce selected time delays between such segments for scrambling effect.

U.S. Pat. No. 3,659,046 of Angleri et al. discloses a message, in binary form, being scrambled in a pseudo-random fashion by logically combining bits.

From U.S. Pat. No. 3,731,197 of J. E. Clark it is known to sample an information-bearing signal and to read the samples in a prearranged abnormal order to obtain unintelligible secured signals.

U.S. Pat. No. 3,824,467 of R. C. French shows an audio signal divided into segments which are rearranged into a new sequence before transmission. Encoding-decoding is provided by binary pseudo-random addressing of storage devices. Each storage device transmits its stored time element while storing a new time element.

U.S. Pat. No. 3,921,151 of G. Guanella teaches dividing an audio signal into segments of equal time intervals which are temporarily stored. Scrambling of the segments by reading-out in a random pattern is achieved so that at each location there is no repetition, nor omission.

U.S. Pat. No. 3,773,977 of G. Guanella, which patent is related to aforementioned U.S. Pat. No. 3,921,151, shows the use of coinciding aperiodic cipher signals from which control signals are derived for determining the storage elements, together with automatic monitoring of the occupancy to avoid omissions, or repetitions.

It is known from U.S. Pat. No. 3,819,852 of Peter Wolf to transmit an audio signal in time-compressed form during the period of a line in the vertical blanking interval of a television system.

The object of the present invention is to add an audio scrambler to a television system, while using to a maximum extent the video installation for scrambling and unscrambling in the transmission and reception of an audio message.

SUMMARY OF THE INVENTION

The invention resides in sampling an audio signal to derive samples at a rate which is proportional to the video line rate; in scrambling at random the order of such samples; and in inserting at least one of the scrambled samples into an unoccupied portion of each of the video line signals being transmitted. The synchronization pulses of the video system are used to clock the sampling, scrambling and inserting steps of such scrambling process.

According to the invention, in a television system transmitting video line signals during successive television fields separated by vertical blanking spaces, apparatus is provided for scrambling a continuous audio signal derived from an audio source. The apparatus includes means for sampling the continuous audio signal at a rate which is proportional to the rate of the video lines. Thus, in a 525-line standard video system where, typically, 480 samples are being sensed per time frame of 1/30 sec., two alternate sample storage devices of 240 locations each are used. The sampling rate will be 480/525 time the television video line rate. This means that all the samples can be read-out in 1/60 sec. from each storage device, alternately, while there is a one-to-one relationship between the video lines being transmitted and the inserted samples. It is also possible to extract twice, or three times this number of samples and to establish a relation of 2 to 1, or 3 to 1, with respect to the occurring video lines.

When scrambling, the samples are reordered in accordance with a pseudo-random pattern, and they are successively inserted, while being read out in such scrambled order from the storage devices, into each of the passing video lines, one, two or even three at a time, as earlier-mentioned.

The insertion of one, or more samples, is effected within an unoccupied portion, e.g. blanking level, of the video signal, thus, after the synchronization interval and the color burst, and before the front edge of the active line, or video signal proper, thereby taking advantage of the unoccupied region which in the standard 525 lines video system, for instance, starts, approximately, 9 $\mu$s after the horizontal pulse has been initiated.

The unscrambling process follows at the receiver end the exact reverse procedure. The audio samples are extracted one-by-one from the video signals, they are assembled to form a segment after being unscrambled and put together and reordered to reconstruct the original continuous audio signal.

The scrambling and unscrambling method is preferably achieved through digital techniques, taking advantage of binary treatment and the use of solid state devices, such as RAM devices and PROM devices, as will appear from a consideration, hereinafter, of the preferred embodiment of the invention.

Another object of the invention is to provide digital audio scrambler in a television system in which digital treatment is organized around a central control logic, preferably a microprocessor, for sorting out binary samples of audio at random and for inserting at least one sample in each video signal as it is being transmitted.

DESCRIPTION OF THE PREFERRED EMBODIMENT

Apparatus has been designed for concurrently performing within a television system the following operations:

sampling of a continuous audio signal;
scrambling of the derived samples; and
inserting into each video line at least one of the scrambled samples.

The operations are achieved in synchronism with the occurrence of the video lines, and the insertion is effected within a non-occupied portion of each transmitted video signal.

Figure 1:
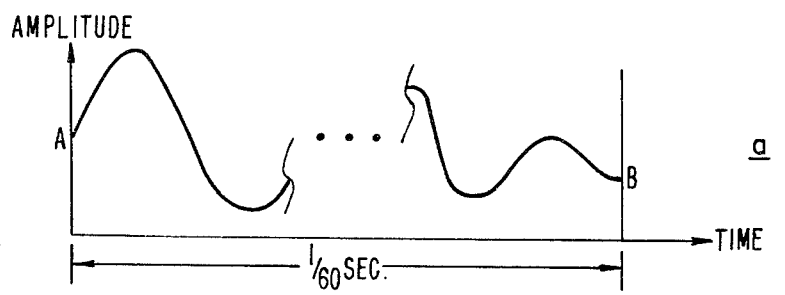
FIG. 1 shows curves which are typical (a) of a segment of audio signal; (b) of the derived audio samples; (c) of the scrambled samples; and (d) of the video signal after insertion of one audio sample.
Figure 1:
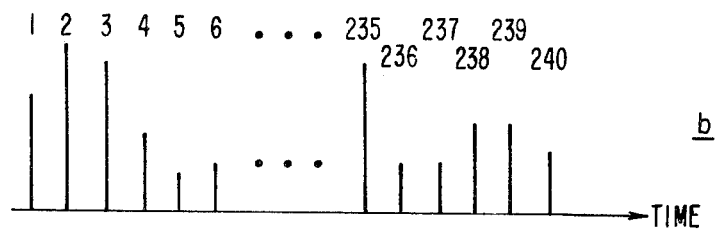
Figure 1:
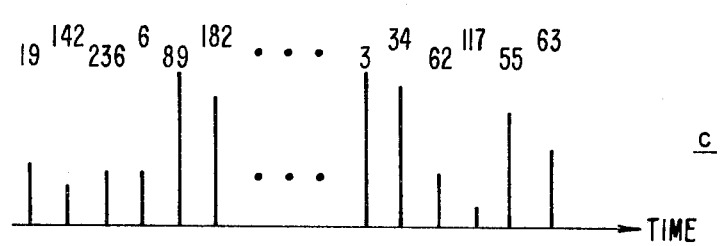
Figure 1:
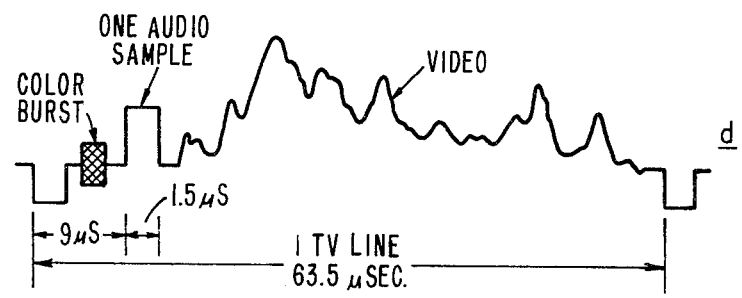

Referring to FIG. 1, curve (a) shows a segment of audio signal AB, which is 1/60 sec. long. Curve (b) indicates 240 audio samples derived from the segment AB of audio under (a). Curve (c) represents scrambled samples derived from curve (b). Curve (c) shows one audio sample inserted at the beginning of a video line already including a synchronizing pulse and a color bust. The active portion lasts 51.4 microseconds and follows a 9.9 microseconds interval, including the 1.6 sec. synchronizing pulse signal. It appears from curve (d) that a three microsecond interval is available for the insertion into the video line of at least one scrambled sample, in accordance with the present invention.

Figure 2:
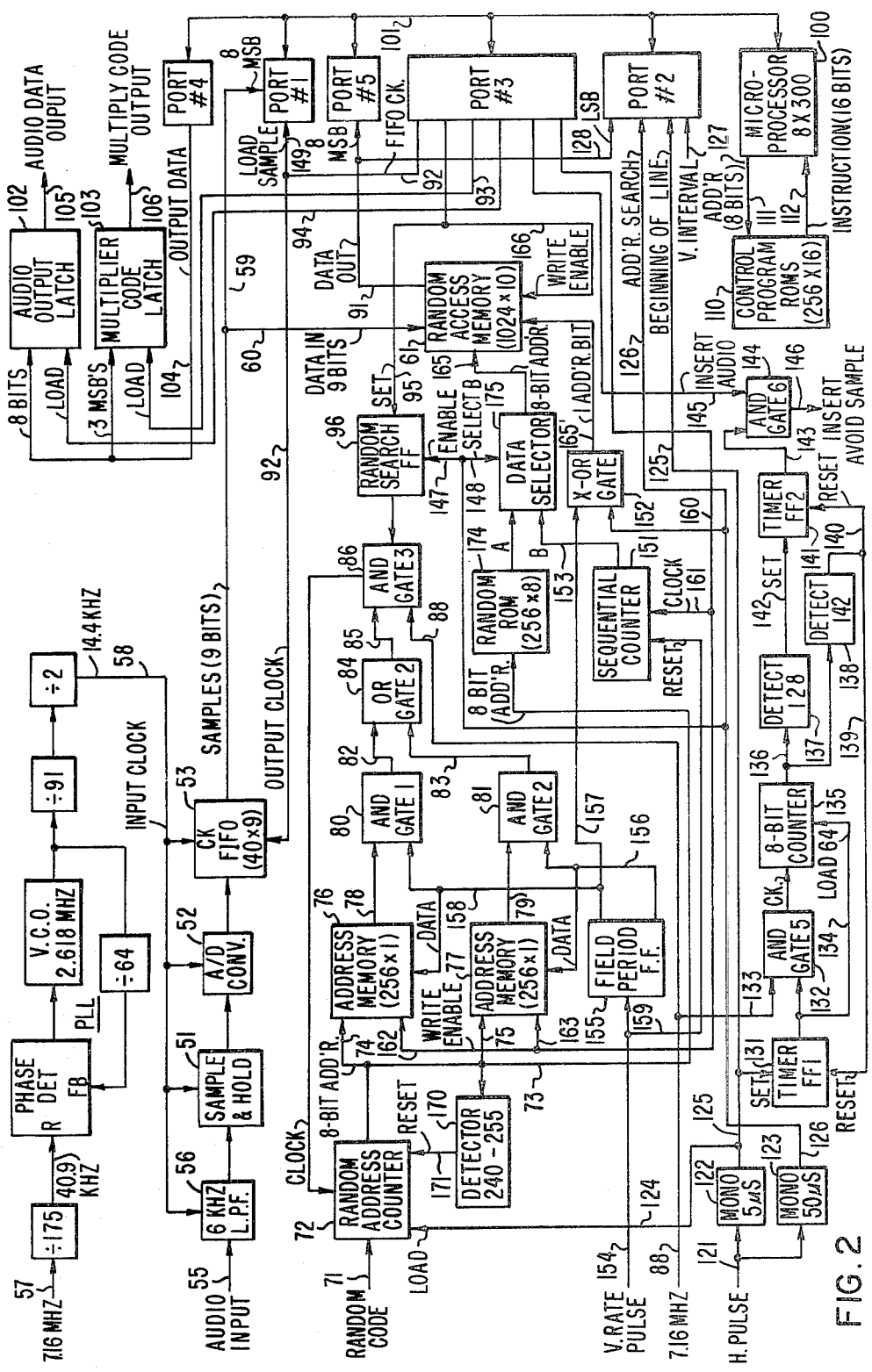
FIG. 2 is the audio scrambler according to the invention at the transmitter side of a television system.

Referring to FIG. 2, it will now be shown (1) how the audio signal segment AB, received on line 55, is being sampled; (2) how the derived samples are being scrambled; and (3) how the insertion of a scrambled sample takes place in timing with the occurrence of an available space within a video line.

The circuit of FIG. 2 comprises the following sections:

An audio sampling section centered around the phase locked loop PLL and circuits 51, 52 which are a sample and hold circuit, and an analog-to-digital converter, respectively.

A sample scrambling section centered around random address counter 72 and random access memory 61. The samples from the audio sampling section are initially stored in a first in-first out (FIFO) memory 53, which operates as a buffer element between the sampling operation and the sequential ordering of the sample into RAM 61. Scrambling results from reading at random the samples stored into RAM 61. Sequential storing is effected when a data selector 175 is in mode B for addressing the RAM, while random reading is performed by addressing the RAM through data selector 175 in the mode A.

FIG. 2 includes also a timer section which is synchronized with a monovibrator 122 of 5 μs delay and a monovibrator 123 of 50 μs delay, both triggered by a horizontal pulse H at the rate of the video lines. The timer action establishes permissible and prohibited time intervals for stages of operation of the sample scrambling section in relation to the horizontal pulse and the field of scanning.

A clock signal of 7–16 MHz appears on line 88, for clocking the addressing process.

FIG. 2 also includes a microprocessing section centered around microprocessor 100 and control program ROM module 110. This section conditions the reading, scrambling and insertion operations within the permissible time intervals established by the timing section.

The interface between the video signals and audio samples for insertion and transmission is shown in FIG. 4.

The sample and hold circuit 51 of FIG. 2 receives the audio signal from line 55 through a 6 kHz low pass filter 56. The samples are converted into digital numbers by A/D converter 52, and such digital numbers are temporarily stored into a first-in first-out (FIFO) device 53, starting with the vertical blanking pulse. Device 53 is read out under control from line 92 on a first-in first-out basis (FIFO). Circuits 51, 52 and 53 are clocked from line 58 at a frequency of 14.4 kHz by a clock signal obtained from a phase-locked loop (PLL), itself fed with a 7.16 MHz signal from line 57.

The stored samples are read continuously from FIFO device 53 to be stored sequentially (sequential counter 151 and date selector 175 in mode B) into a Random Access Memory (RAM) 61. RAM 61 is in two sections, alternately used for storing and reading like taught in U.S. Pat. No. 4,070,693 of Shutterly.

Typically A/D converter 52 is a solid state device known as DATEL EH10B providing 8 bits per sample. The FIFO device 53 is of the type 3351 having 40×9 locations. The two RAM sections of circuit 61 are obtained from a single solid state device known as "Memory-Nine F93415 RAMS" having: a data input pin 15 multiplexed with the nine output terminals of the FIFO device (shown by lines 59 and 60); a data output pin 7 connected to the 8 bit input (line 91 in FIG. 2) from a Port #5 and a Port #2; a 9-bit address (8 bits on line 165 from data selector 175, plus one most significant bit on line 165' from exclusive OR gate 152 for determining which of the two sections of the RAM is to be used) on pins 2–6, and 9–12.

RAM device 61 stores the samples received from line 60 in their natural order into locations defined by a Write-address received from sequential counter 151 and via line 153 from data selector 175, in the Write-mode (B). In order to effect scrambling, these samples, when readout, are extracted in a random fashion as given by the addresses from Random ROM 174 through data selector 175 in the Read-mode A. The way such randomness is achieved will now be described by reference to Random Access Counter 72 and Random ROM 174.

A random code on line 71 causes Random Access Counter 72 to output on lines 73, 74 and 75 an 8-bit address which is at random. However, it is necessary to avoid, for true randomness, that one location in the Random Access Memory 61 be sought and used twice, or that one be omitted, since all the samples read out from FIFO 53 must be stored in and read out of the RAM univocally in whatever order. It is observed here that Random ROM 174 is responsive via line 73 to Random Address Counter 72 and that it outputs into RAM 61, when data selector 175 is in the A mode. Circuit 174 is used to dissociate the randomness of the audio scrambling from the randomness of the code of line 71 which may be used elsewhere, for instance for scrambling the video.

While using a different approach, the method of preventing repetitions or omissions in the address of line 73, is similar in concept to what is disclosed in the aforementioned U.S. Pat. No. 3,921,151 of Guanella. A distinctive feature is found, however, in the way two Address Memory devices 76, 77 are used as scratch pads, alternately, to store from 74 and 75, respectively, the random address proposed by circuit 72, on line 73. Alternation in the operation of devices 76, 77 is obtained by lines 158, 156, respectively, which have opposite binary bits. One memory stores, while the other is under erasure. The outputs 78, 79 from the memories are checked by AND devices 80, 81, respectively, against the bits of lines 158, 159. When a duplication occurs between the binary state to be stored and the binary state already at the location, AND gate 80 (or 81), OR gate 84 (by line 82, or 83) and, AND gate 86 (via line 85), pass the clock signal of line 88, thereby to clock and advance Random Access Counter 72. Random Access Counter 72 will thus be advanced to the next location each time a location is found to be already "occupied" as a result of a previously operative address, and such advance will be repeated until an "empty" location has been found.

Figure 3:
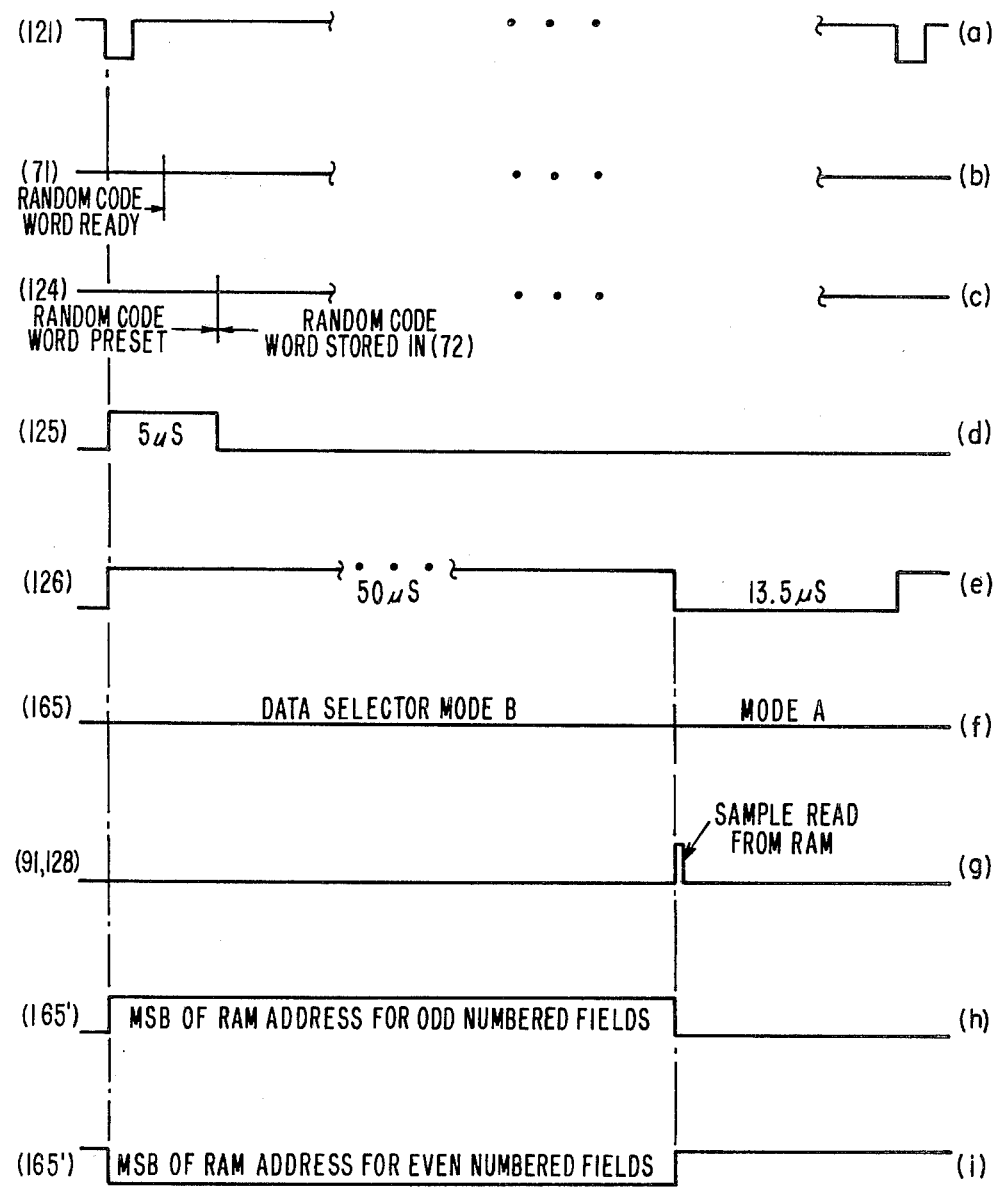
FIG. 3 shows with curves key instants established by the timer of FIG. 2 for storing, reading and latching of samples.

Referring to the curves of FIG. 3, the H-pulse of line 121 establishes on the front edge thereof an initial time from which a 5 $\mu$s delay (curve (d)) and a 50 $\mu$s delay (curve (e)) are generated by the respective monovibrator 122, 123 of FIG. 2. The random code number (which may be derived from a random generator used to scramble the video signals) is formed on line 71. It appears as an 8-bit word ready for setting counter 72 after a delay shown by curve (b). When the 5 $\mu$s delay has taken place (curve (e)), by line 124 the random number is stored into counter 72. For all the 240 lines of one field of scanning (one is the odd numbered lines, the other for the even numbered lines) as established by the vertical rate pulse of line 154 and the field period flip-flop 155, the most significant bit of the RAM address is determined and passed through Exclusive-OR gate 152 onto line 165'. The status of line 165' is shown by curves (h) or (i) of FIG. 3. Data selector 175 changes from the B mode into the A mode after 50 $\mu$s, by lines 126 and 148. As a result, as shown by curve (g) the sample indicated by the address is derived from lines 91 and 128 at the request of the microprocessor.

The insertion of a sample concurrently with the occurrence of a video line, requires consideration of the timer section of FIG. 2.

Timing for the insertion of the audio samples into the outgoing TV lines is determined by counting cycles of the 7.16 MHz clock of lines 88, 133 by reference to the beginning of each TV line as indicated by the H-pulse of line 121. The 5 $\mu$sec. monovibrator 122 sets a flip-flop Timer 131 to start clocking from line 133, via AND gate 132, an 8-bit Counter 135 which by line 134 has been initially set to count 64. Count 128 is detected at 137 to set a flip-flop timer 141, and count 142 is detected at 138 to reset the flip-flop timer 141, while resetting by line 139 the flip-flop timer 131. This results in opening by line 143 an AND gate 144 to produce on line 146 an Insert Audio signal. The timing of counter 135 and timer 141 establishes a window starting exactly 9 $\mu$s after the H-pulse, e.g., the window matches the unoccupied portion of the video line (see FIG. 1). Now, a sample latched in latch 102 of FIG. 2 is derived for insertion from output line 105, when the insertion is permitted by the window of line 146, as will be shown hereinafter.

As seen from microprocessor 100 through Ports #1 to #5, the control logic is as follows:

The outputted data on line 91 are passed through Port #5 onto the 8-bit data bus 101 of microprocessor 100. The sample after processing by the microprocessor is passed through Port #4 to be stored into audio output latch 102, as an 8-bit word. From there, as earlier mentioned, insertion takes place by line 105. The logic for enabling the insertion is by line 145 through Port #3. This decision takes into account the signal of line 125 which is indicative of an occurring video line and the signal of line 127 which is indicative of the vertical blanking space, both received through Port #2. Port #2 also receives the signal of line 126 which authorizes the address search, and informs the processor when to call for the sample of the RAM from lines 91 and 128. Port #3 transmits more commands from microprocessor 100. One of these is the address clock of line 160 for Address Memories 76, 77, and sequential counter 151, by 161. Port #3, by lines 95 and 166, also causes clocking of the addresses in Random Address Counter 72 and writing at the addressed locations of the FIFO data from line 60. By line 92 the stored samples are clocked out of FIFO 53. Lines 93 and 94 load the multiplier code latch 103 and the audio output latch, respectively.

Referring to copending patent application Ser. No. 33,064 filed concurrently by Harold B. Shutterly, FIG. 2 also shows a feature for reducing noise in the transmission of the samples inserted by the audio scrambler. To this effect, the microprocessor calls, via Port #1 and line 59, for the samples stored in the FIFO circuit 53. These are treated digitally and logically by the microprocessor in accordance with the control program module 110. From an evaluation of the samples derived within 1/60 sec., (i.e., segment AB) which form a group to be scrambled by the Random Access Memory 61, the microprocessor establishes the average signal and calculates a correction factor applied discriminately to the samples. This operation is gated via Port #1, by lines 92 and 149, and the result is a multiplied 8-bit sample and a 3-bit multiplier code which are passed by Port #4 onto line 104. The multiplier code is latched into multiplier code latch 103 to be sent on line 106 for transmission as a code to be used in reverse when a corrective factor will be applied to the audio data at the receiver end.

The overall scheme for audio sample scrambling and audio sample insertion in the video lines will now be explained in detail in the light of the foregoing considerations by reference to the elements of the circuitry of FIG. 2.

The scrambling of the audio signal is produced by sampling the input signal at a sufficiently high frequency (line 58) to preserve the signal content, and then transmitting the samples in a pseudo-random order. The audio signal is bandlimited to 6 kHz and then sampled at a rate of 14,400 samples per second, with the result that 240 samples are produced in each one-sixtieth of a second corresponding to a field period (circuit 155). Each group of 240 samples is first-stored in F1F0 circuit 53, then collected in the random-access memory 61, to be read out of the memory in the following one-sixtieth of a second in a pseudo-random order. The process is continuous so that in each one-sixtieth of a second 240 new samples are collected in one section of the memory, while the 240 previous samples are read out from the other section of the memory. A completely different pseudo-random readout sequence is used for each group of 240 samples.

The samples are transmitted in analog form as part of the scrambled TV waveform. In the illustration of FIG. 2, each group of 240 samples is transmitted in one TV field at a rate of one sample per active TV line. Each audio sample is inserted at the beginning of a TV line, following the color burst (FIG. 1).

The effect of re-ordering the audio samples in an essentially random fashion is to convert the signal into a noise-like form that contains none of the frequency characteristics required for intelligibility.

Descrambling at an authorized receiver is accomplished by reversing the scrambling process. The samples are recovered from the received video and then sorted out in groups of 240 per field by a random-access memory. Pseudo-random addressing of the memory during the storage process restores the order of the samples in the memory to the original sequence. The descrambled audio is then obtained by reading the samples out of the memory in consecutive order and smoothing them in a lowpass filter.

There are three primary factors that contribute to the high level of security of this scrambling technique:

1. The minimal size of the signal elements that are interchanged. Individual signal samples, once out of sequence, provide little, or no information, about the original neighboring samples; there is no "slope" or other correlation information present.

2. The range of positional interchange is over a time period of one-sixtieth of a second. Consequently, any frequency component down to 60 Hz can be completely destroyed by the pseudo-random sample interchange.

3. The use of a completely different pseudo-random interchange sequence in each one-sixtieth of a second. This very greatly increases the difficulty of unauthorized descrambling by trial and error methods. If a given one-sixtieth of a second audio segment can be descrambled, no information is obtained about the correct sample sequence in other segments. More importantly, if several one-sixtieths of a second segments of audio have to be descrambled simultaneously in order to obtain a recognizable sound, the number of possible sample orders to be tried increases exponently with the number of segments.

One important feature of this scrambling technique is that the processing time delay required both for scrambling and descrambling is only one-sixtieth of a second, or 16.67 milliseconds. On a two-way satellite communication link the total loop delay due to scrambling and descrambling is $4 \times 16.67$ or 66.68 milliseconds. This is important because experiments have shown that two-way voice communication is impaired for total loop delays greater than 600 milliseconds. The subjective effect of longer delays has been described by Bell Labs as "sticky" communications. Since the round trip propagation time for satellite links is about 480 milliseconds, it is essential for this application that the processing delays for scrambling and descrambling be as small as possible.

The audio scrambler samples the input audio signal 240 times in each TV field period and stores the samples in order into a memory. The samples that are stored in one field period are read out in the next field period in a random order and transmitted at a rate of one per active TV line.

As shown in FIG. 2, by the phase locked loop circuit PLL, the input audio signal from line 55 is band limited to frequencies below 6 kHz and is sampled at a rate of 14.4 kHz. The audio sampling clock is generated by means of the phase-locked loop PLL driven from a 7.16 MHz clock. This clock signal can be generated within the video scrambler if the system provides for video scrambling. Such clocking arrangement produces exactly 240 audio samples during each TV field period. The samples are converted from analog form to 9-bit digital words which are stored initially into the first-in, first-out memory (F1F0) circuit 53. Circuit 53 acts as a buffer between the input samples and the remainder of the scrambling system. The samples are processed at TV line rate during the active lines of each TV field period.

The readout of audio samples from circuit 53 is controlled by microprocessor (100) by means of a clock pulse on line 92 from Port #3. Typically, microprocessor 100 is a $8 \times 300$ device. The microprocessor uses the H-pulse of line 121 (derived from the video line sync) and the Vertical Interval signal of line 127, as timing references. The H-pulse triggers the 5 $\mu$sec. monovibrator 122 which produces on line 125 a "Beginning of Line" signal to Port #2. The presence of this signal on line 125, in the absence of a Vertical Interval signal on line 127, indicates to the microprocessor an active video line.

In general, at the beginning of an active line the microprocessor clocks a sample out of the F1F0 circuit 53 and, via the Write Enable signal of line 166 from Port #3, loads the sample into the RAM (Random Access Memory) 61. The output of the 50 $\mu$sec. monovibrator 123, holds data selector 175 in the B mode, so that the RAM is addressed by the Sequential Counter 151 during loading of each sample from the F1F0 circuit 53. The Sequential Counter 151 is reset on line 159 by the Vertical Rate pulse from the video scrambler, so that sequential addressing can start at zero at the beginning of each TV field period. Sequential counter 151 is advanced by the microprocessor via line 161 by one count near the end of each active line until, at count 239, the 240th sample is loaded into RAM 61.

Each sample from F1F0 circuit 53 is also loaded via line 59 into the microprocessor, via Port #1. In accordance with the teachings of the aforementioned copending application, the microprocessor determines the maximum amplitude multiplier for noise reduction. When all of the 240 samples have been evaluated, the microprocessor contains a list (in symbolic form) of all the multipliers that are applicable to one, or more, of the 240 samples. For example, if multipliers 4, 16, and 32 are in the list, this indicates that all of the 240 sample amplitudes in RAM 61 can be multiplied by 4, while some can be multiplied by 16 and some by 32. Since the smallest multiplier is 4, in this instance, it is the multiplier applicable to all the samples. It is 4 which is retained for use during the sample multiplication process. The multiplication takes place in the microprocessor during the read-out of the samples from RAM 61.

Although RAM 61 has 1024 locations of 9-bits, it is actually divided into two memory sections using only 240 locations in each section. The sections are used alternately. During each field period, one memory section stores 240 samples in sequence, while 240 samples are being read-out in pseudo-random order from the other memory section. The most significant bit (MSB) in the RAM address, which appears on line 165', is used to switch RAM 61 between the two memory sections. The output of the 50 μsec. monovibrator 123 goes to Exclusive-OR device 152 together with the output of the Field period flip-flop 155 to produce the MSB address bit of line 165'. In each active video line period, one sample is written into the memory section which has been selected during the 50 μsec. pulse. After this, the other memory section is selected for writing and one sample is read out from the first one. The effect of the field period signal on lines 157 and 165, which reverses at field rate (see curves (h) (i) of FIG. 3) is to interchange the two memories at field rate. Thus the memory section writtin into during one field period is read-out during the next, etc.

The pseudo-random addresses used in reading out samples from RAM 61 are determined by pseudo-random numbers which are assumed to be generated in a random-code-generator for video scrambling. The random code numbers are fed by line 71 into Random Address Counter 72. At the beginning of each video line, the count of the Random Address Counter 72 is preset to the current 8-bit pseudo-random number from the video scrambler. The counter output addresses two 256×1 bit Address Memories 76, 77 and a Random ROM 174 that, in turn, addresses RAM 61 through Data Selector 175 when the latter is the A mode (curve (f) of FIG. 3). The Ramdon ROM 174 contains the numbers 0 to 239 arranged in a randomly selected sequence. When addressed by the Random Address Counter 72 the ROM merely interchanges each address in the range 0 to 239 with another address in the same range. This totally dissociates the audio scrambling code from the video scrambling code.

The two Address Memories 76, 77 are used as aforesaid to prevent any pseudo-random read-out address from being used more than once in a given field period. Since they have 256 locations, a detector 170 is used to reset circuit 72 when 240 locations have been used. The 8-bit numbers that are preset (see curve (c) in FIG. 3) into the Random Address Counter 78 are essentially random, and consequently there is nothing to prevent any particular number from occurring several times during the read-out of 240 samples from RAM 61. If this happened, one or more samples stored in the RAM would be read out several times, while other samples would not be read out at all. To prevent this, a record is kept in the Address Memories 76, 77 of each address used to read-out a sample. These Address Memories are used alternately, one in one field period, the other in the next field period. The data inputs to the two memories are provided by the complementary outputs on lines 158, 156 of the Field Period flip-flop 155. The record is kept by storing a "1" at each address that is used for accessing a sample from the RAM. After a sample has been read from RAM 61 into Port #5 by microprocessor 100, a Write Enable signal is sent via line 160 to clock both Address Memories, via Port #3. Consequently, a "1" is writtin (on line 158 for instance) into the active memory, while a "0" is (on line 156 in this case) writtin into the inactive memory. Thus, as the active Address Memory is gradually being filled during the RAM read-out process, the alternate Address Memory is being cleared for use in the next field period.

When the Random Address Counter 72 is preset (curve (c) of FIG. 3) to an address that has been used previously in the same field period, the active Address Memory opens AND Gate 86, thereby permitting the 7.16 MHz clock to advance via line 87 the Random Address Counter 72 to the next address. Clocking continues until an unused address is reached. The Address Memory, then, closes AND Gate 86.

The process of searching for the next random address is initiated by the microprocessor during the 5 μsec. "Beginning of Line" signal on line 125 (curve (d) of FIG. 3). The Write Enable signal of line 166 that stores a sample from F1F0 circuit 53 in RAM 61 also initiates by line 95 the address search by setting Random Search flip-flop 96. This removes an inhibit signal from AND Gate 86, which permits clocking of the Random Address Counter 72 by the 7.16 MHz clock signal of line 88.

During clocking of the Random Address Counter 72, the address may be advanced beyond 239 into the 240 to 255 range. Also the counter may be preset initially to a count beyond 239. Since there are no samples stored outside of the 0 to 239 range of the RAM, an out-of-range Detector 170 is used to reset the Random Address Counter to zero; the search then continues for a valid, unused address.

The maximum search time required to locate a valid address is 35.7 μsec. The remainder of the 50 μsec. Delay can therefore be used by the microprocessor in each active TV line period as an indication that the RAM is addressed by a valid address. A sample is then read (see curve (g) in FIG. 3) into the microprocessor via Port #5 and Port #2. The amplitude of each sample is, there, multiplied by the multiplier which has been determined from the group of 240 samples as it was stored into the RAM during the previous field period. Each multiplied sample is outputted through Port #4 to the Audio Output Latch 102, where it is held for insertion at the beginning of the next video line.

Figure 4A:
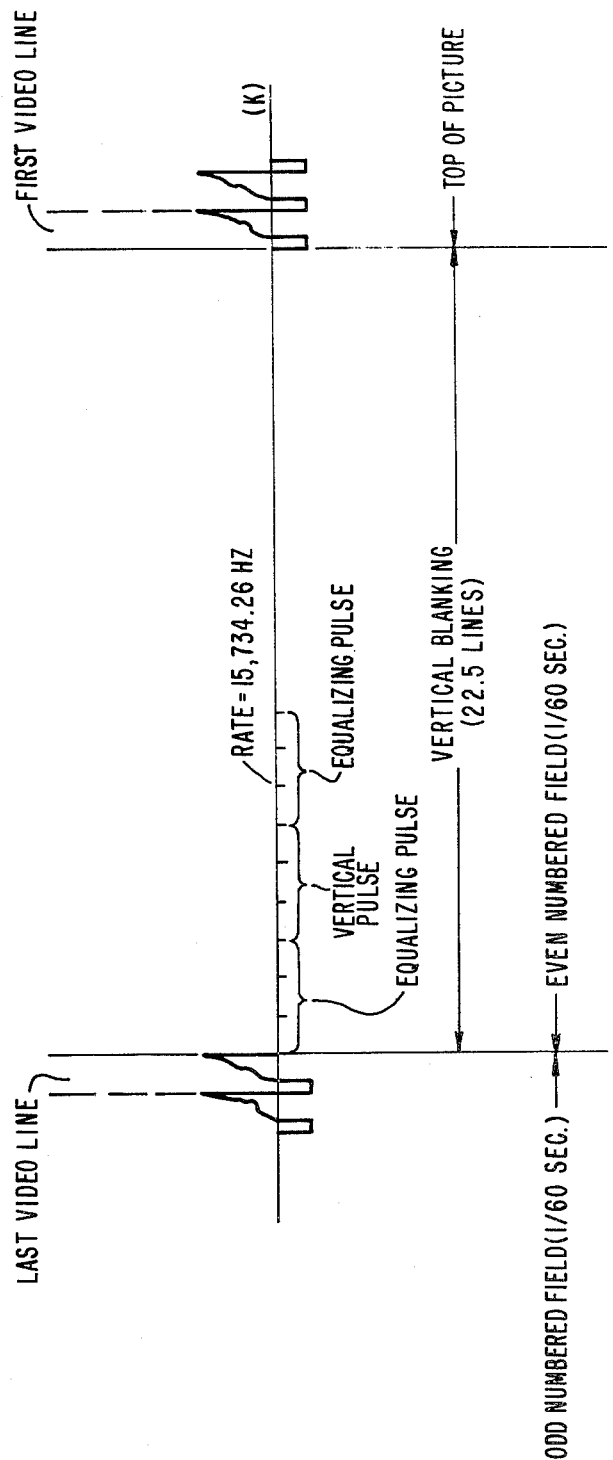
FIGS. 4A and 4B show, at a television field scale, the timing for the insertion process.
Figure 4B:
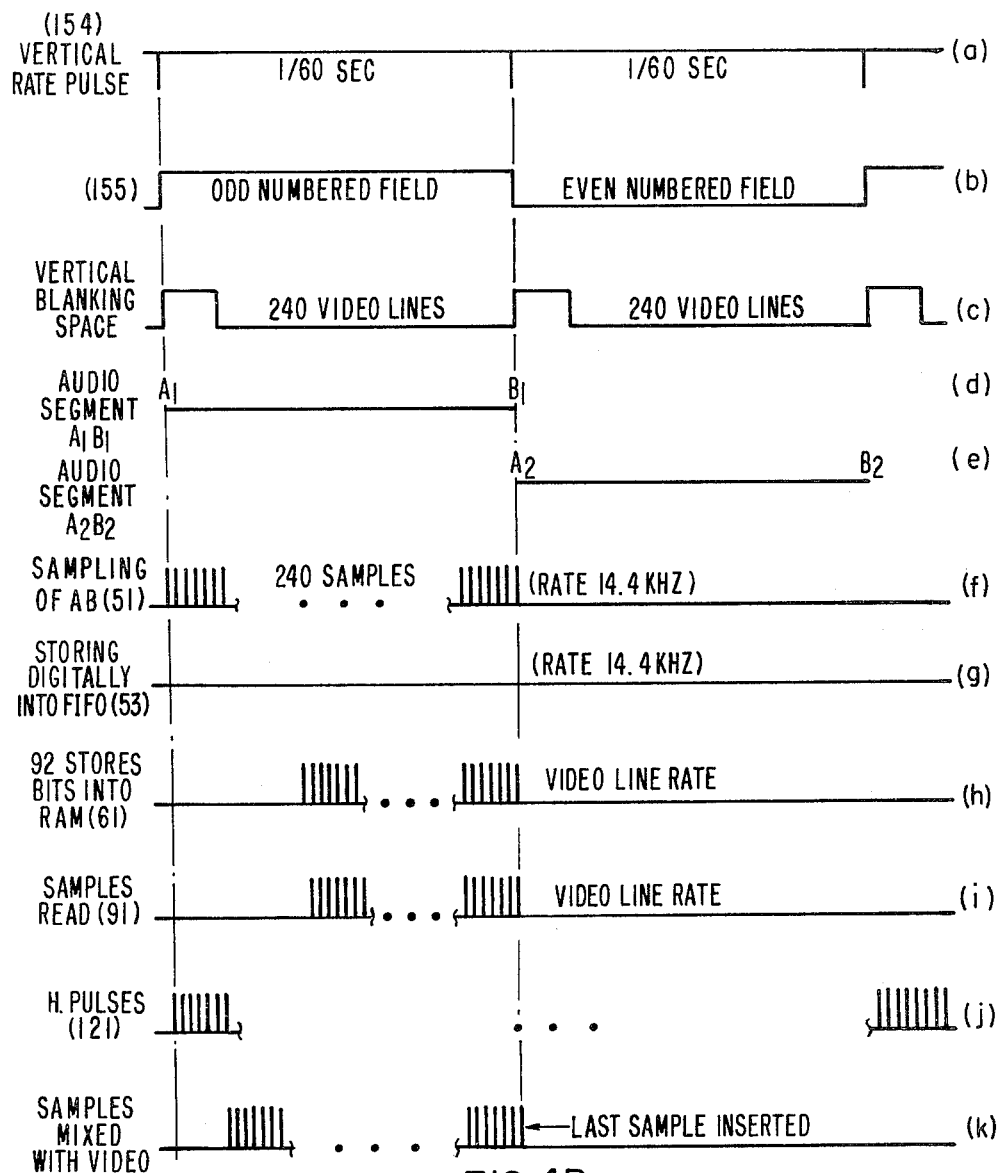

While FIG. 3 shows with curves, by reference to an H-pulse, the sampling and scrambling process at the scale of the video lines, FIGS. 4A and 4B show the overall process at the scale of the video frames for successive audio segments AB and A'B', each 1/60 sec. long. FIG. 4A shows the vertical blanking space. FIG. 4B shows two successive fields of a video frame. The operative steps are readily recognized from a consideration of the steps of FIG. 3 and the explanations already provided.

Figure 5:
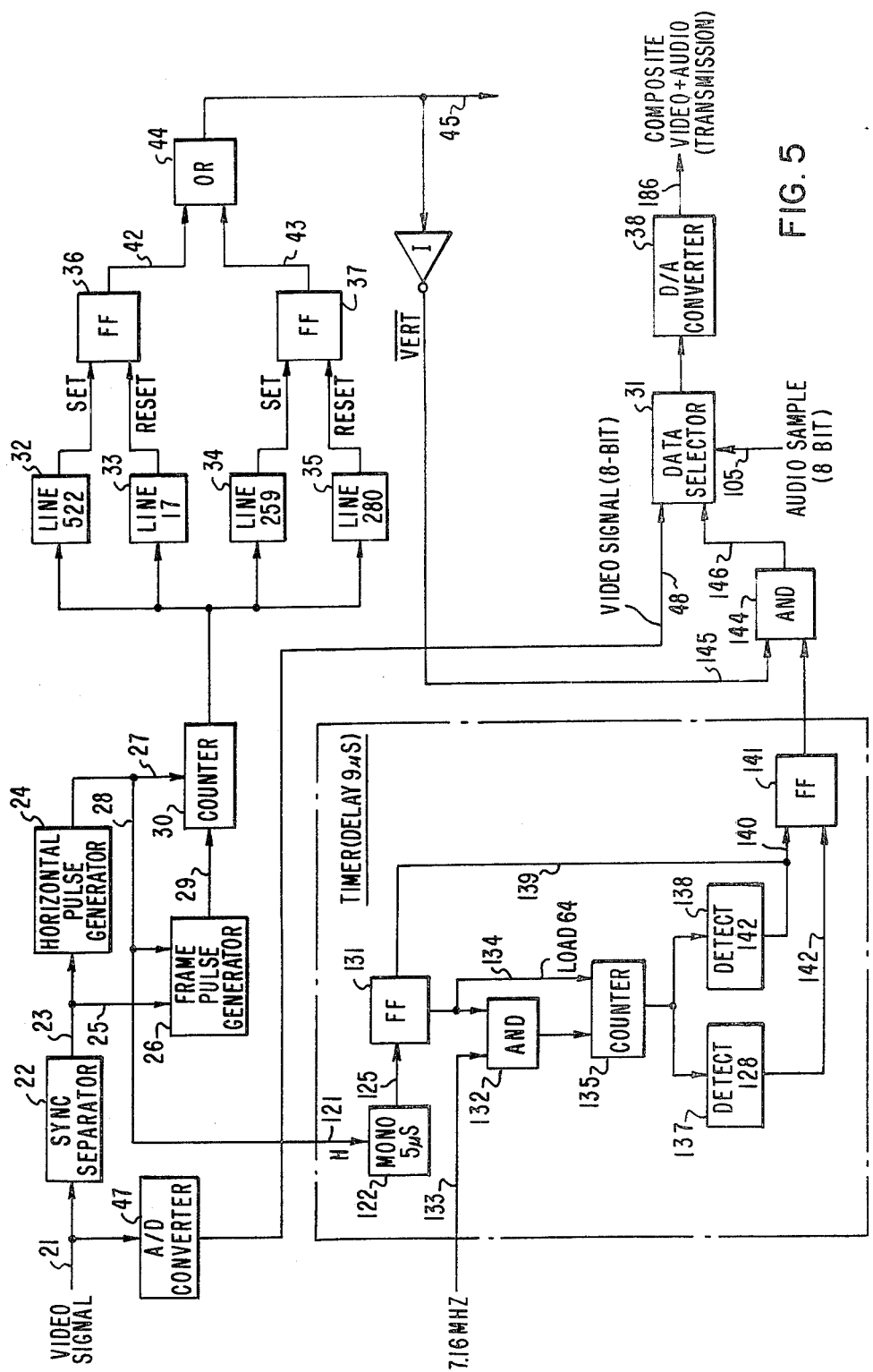
FIG. 5 shows circuitry of the television system coupled with the insertion circuitry of the audio scrambler.

The insertion of one digital sample in a video line will now be considered by reference to lines 105 and 146 of FIG. 2 and to the block diagram of FIG. 5 which shows the interface between the video lines to be transmitted and the audio sample to be inserted. Referring to FIG.

5, sync separator 22 detects the horizontal pulse from the video signal of line 21, which triggers a horizontal pulse generator 24 providing on lines 28 and 121 the H-pulse signal of FIG. 2. The H-pulse is shown inputted via line 121 into the 9 μs delay timer of FIG. 2 providing one input to AND device 144 from which is outputted on line 146 the Insert Audio Sample Signal of FIG. 2. Signal VERT which determines the vertical blanking space of FIG. 4A is, as generally known, derived by counting at 30 the video lines in a video frame defined by frame pulse generator 26. Counter 30 is inputting into four detectors: 32 detects line 522, 33 detects line 17, 34 detects line 259, and 35 detects line 280. Flip-flops 36 and 37, associated with the first and second pair of detectors, go into OR device 44 to generate the blanking space pulses VERT on line 45 which after inverting to VERT are gating on line 145 AND gate 144.

The video signal of line 21 is converted into digital by A/D converter 47. The insertion of the audio samples into the outgoing video lines is effected digitally. The timing is determined by counting cycles of the 7.16 MHz clock from the beginning of each video line (H-pulse). The audio sample from line 105 is inserted in response to signal 146 switching a data selector 31 from the 8-bit video signal of line 48 to the output 105 of the Audio Output Latch 102. The audio sample is converted from digital-to-analog form, along with the video signal, in the video D/A converter 38. At count 142 by detector 138 FF1 Timer flip-flop 131 (FIG. 2) FF2 and Timer flip-flop 141 (FIG. 2) are reset to end the audio insertion. The window for insertion of an audio sample has a duration of approximately 2 μsec., which provides a margin of error for locating the samples in the descrambler of approximately ±0.5 μsec.

Two additional signals are also inserted in the scrambled video signal.

One is the multiplier factor K, mentioned in the aforementioned co-pending application, which is transmitted as a 3-bit code along with the video synchronization information. It is inserted during the vertical interval immediately preceding the active TV lines containing the audio samples that are multiplied by the factor K. The 3-bit code representing the multiplier is transferred from the microprocessor via Port #4 to the Multiplier Code Latch 130, from where it is automatically inserted via line 106 by means of a conventional circuitry within the video system.

The other additional signal is an artificial audio sample also explained in the aforementioned copending application. Generated by the microprocessor this additional signal is set to the mean audio signal level M (171 if the range is from 0 to 255). Transmission of this reference-level sample is possible because there are actually 242 active TV lines in each field, thus two more than the number of lines used for insertion of an audio sample. The first active line in each field is not used for audio transmission. When this is the case, the Insert Audio signal of line 146 is blocked by an inhibit signal appearing on line 145 from the microprocessor thus blocking the AND Gate 144. The second active line is used to transmit the reference-level sample M in the same way as any of the audio samples.

In essence the audio descrambler reverses the process used in the scrambler, where audio samples are written into a memory in sequence and then read out in pseudo-random order. In the descrambler, after the samples are recovered from the received scrambled TV waveform, they are writtin into a memory in pseudo-random order and then read out in sequence. This returns the samples to the correct sequential order to produce the descrambled audio signal.

Figure 6:
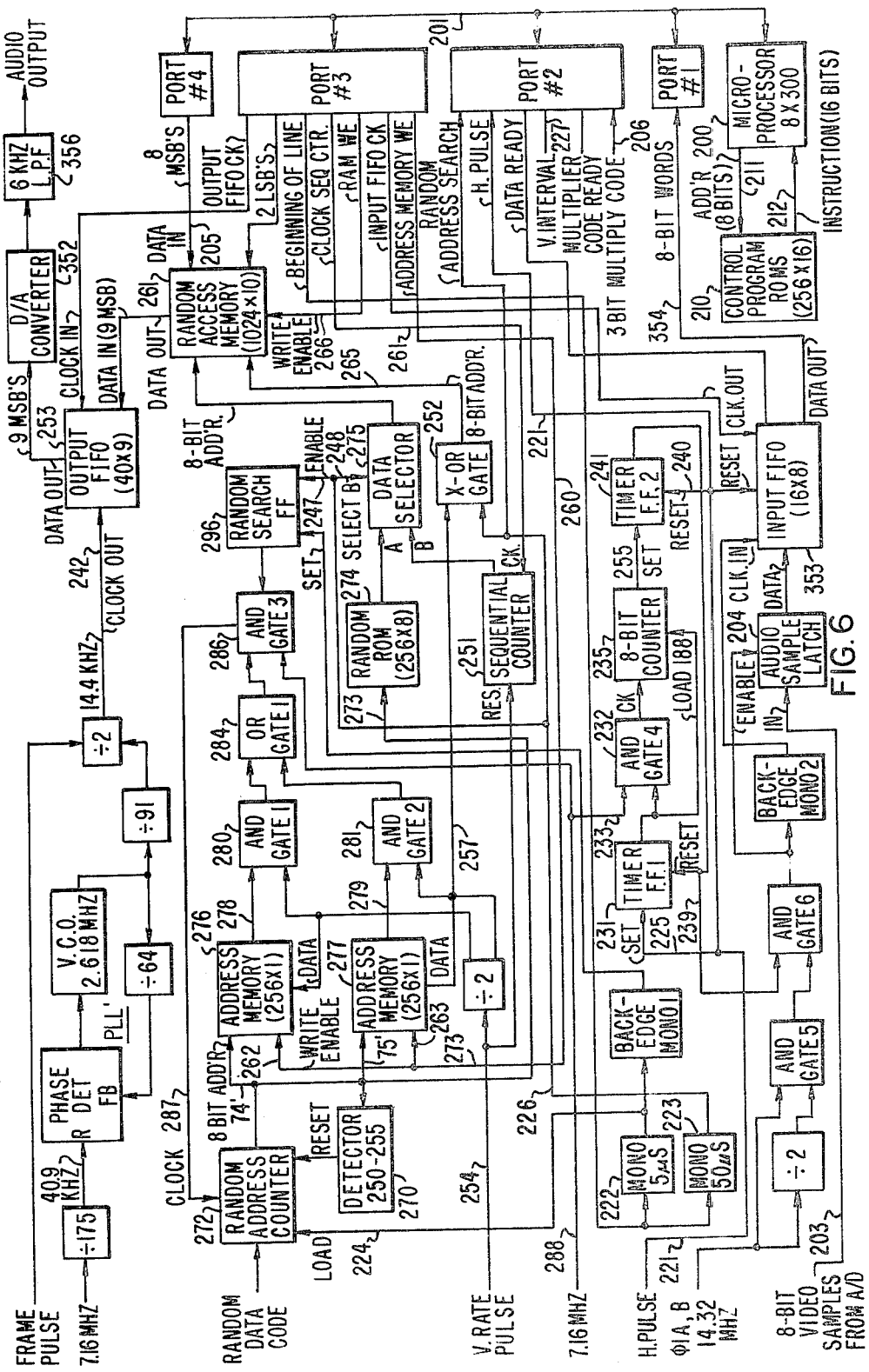
FIG. 6 is the audio unscrambler according to the invention as applied at the receiver side of the television system in correlation with the audio scrambler of FIG. 2.

FIG. 6 is a block diagram of the audio descrambler which at the receiver side of the television system corresponds to the audio scrambler of FIG. 2 for the transmitter. Blocks which indicate a similar function in the reverse process have been given, wherever possible the same reference numeral raised by 200 where the reference numeral of FIG. 2 has one or two digits, raised by 100 where it has three digits. Thus, the equivalent of the Random Address Counter 72 is now 272, while Ramdon Access Memory 61 becomes 261, vertical rate pulse line 154 is 254, and so on.

An understanding of the circuit of FIG. 6 is straightforward in the light of the explanations given for the audio scrambler circuitry of FIG. 2. Some original features in the audio unscrambler should, however, be mentioned as follows:

In the audio descrambling system of FIG. 6, the input signal consists of 8-bit video signal samples, at a 14.32 MHz data rate which are derived on line 203 after conversion to digital form (the A/D converter is not shown). The video samples that represent the audio pulse on each active video line are located at the exact time by means of a digital timer. The timer section comprises circuit elements 222, 223, 231, 232, 235 and 241. They are very similar to those of the timer in the audio scrambler of FIG. 2. The timer starts at the H-pulse and counts 67 cycles of the 7.16 MHz clock of line 288, then initiates the loading of input signal samples.

Alternate samples are latched into an Audio Sample Latch 204 by means of a properly timed 7.16 MHz clock. Each latched sample is then transferred to an Input F1F0 (first-in, first-out memory) circuit 353. In each active video line, the Input F1F0 circuit 353 stores the video samples representing the received audio pulse until they can be processed by the microprocessor. It automatically blocks out further inputs when it is full.

As a result, 16 samples are selected from the 920 samples scanned at a 14.32 MHz rate along the video signals, which coincide in time with the passing of the inserted audio sample within the window defined by the timer section. Of these 16 samples, the microprocessor retains only one of every two. Thus, the microprocessor 200 individually clocks eight video samples (representing one audio sample) out of the Input F1F0 circuit 353, by line 354, into Port #1, then, into the microprocessor. The eight samples are summed up and divided by eight. This improves the signal-to-noise ratio of the received sample. The first such audio sample received in each field is the reference signal set to the mean audio signal level. This particular signal is stored in the microprocessor and is used, before dividing the amplitudes of the following audio samples. The divisor that is used is spcified by the 3-bit multiplier code which had been transmitted. A new multiplier code applicable to a new segment of audio is loaded into Port #2 of the microprocessor during each vertical interval. A "Multiplier Code Ready" signal is supplied to the microprocessor via Port #2 to initiate the loading of each multiplier.

The search for a pseudo-random address for the Random Access Memory (RAM) 261 proceeds in parallel with the integration of the input video samples and the amplitude division process in the microprocessor. The pseudo-random addresses are generated in exactly the same manner as for the audio scrambler of FIG. 2. The random code generator typically is one used in a video descrambler. It is synchronized with the generator in the associated video scrambler and so produces an identical sequence of numbers. Using these numbers as starting points, the audio descrambler generates a sequence of pseudo-random addresses that are identical to those generated in the audio scrambler. The microprocessor 200 uses the end of the 50 μsec. period derived from monovibrator 223 on line 226, as an indication that a valid pseudo-random address has been found in each active video line. The microprocessor then loads a processed audio sample, via Port #4 and line 205, into RAM 261 at the selected address. Since the address is the same address that was used in the scrambler to read the sample from a RAM, this process returns each sample to its original sequential order within RAM 261.

Like in the audio scrambler of FIG. 2, RAM 261 is operated as two separate 240 sample memories. In each field period, while one memory is loaded with 240 samples using pseudo-random addresses, the second memory is read out sequentially. RAM 261 is addressed by a Sequential Counter 251 during the 50 μsec. delay period, and the microprocessor clocks (via Port #3) one sample from the RAM into Output Memory (F1F0) circuit 253 at the beginning of each active video line. The samples are clocked into circuit 253 at line rate and are clocked out at a uniform rate of 14.4 kHz. Again, this is just the reverse of the process used in the audio scrambler of FIG. 2.

The output clock on line 258 is generated by means of a phase-locked loop PLL in exactly the same way that the input F1F0 clock of line 58 is generated in the audio scrambler of FIG. 2. The 9-bit samples from the Output F1F0 circuit 253 are converted into analog by a D/A converter 352, and the output is lowpass filtered at 356 to recover the original baseband audio signal.

The invention provides for the use of more than one audio signal to be transmitted, and/or the transmission of more than one audio sample inserted in each video line. For these designs, the following considerations apply:

The first consideration in extending the current signal secure audio channel system to two or three secure channels is the format of the scrambled output signal. The most direct extension of the aforestated format is to add one additional audio pulse on each active TV line for each additional audio channel; this format is illustrated in FIG. 7 by curve (a).

This arrangement, however, can result in crosstalk between the audio channels because of the limited time available on each line for audio pulses. Typically, the single-channel audio system just described uses approximately 2 μsec. for the single audio pulse on each active line. This allows for 1 μsec. of pulse integration at the receiver to improve the signal-to-noise ratio, and ±0.5 μsec. for positional tolerance. The line time available for audio pulses consists of part of the line blanking period and part of both ends of the active line period. The ends of the active line can be deleted because they are not seen due to overscanning on TV monitors. The maximum time that can be used for audio is about 3 μsec., since 1.5 μsec. are already used for repeating video samples in the scrambled video waveform. If 1 μsec. audio pulses are used in a three-channel system, the receiver integration time will probably have to be cut to 0.5 μsec., and the pulse positioning requirements will be quite critical if crosstalk is to be avoided.

Figure 7:
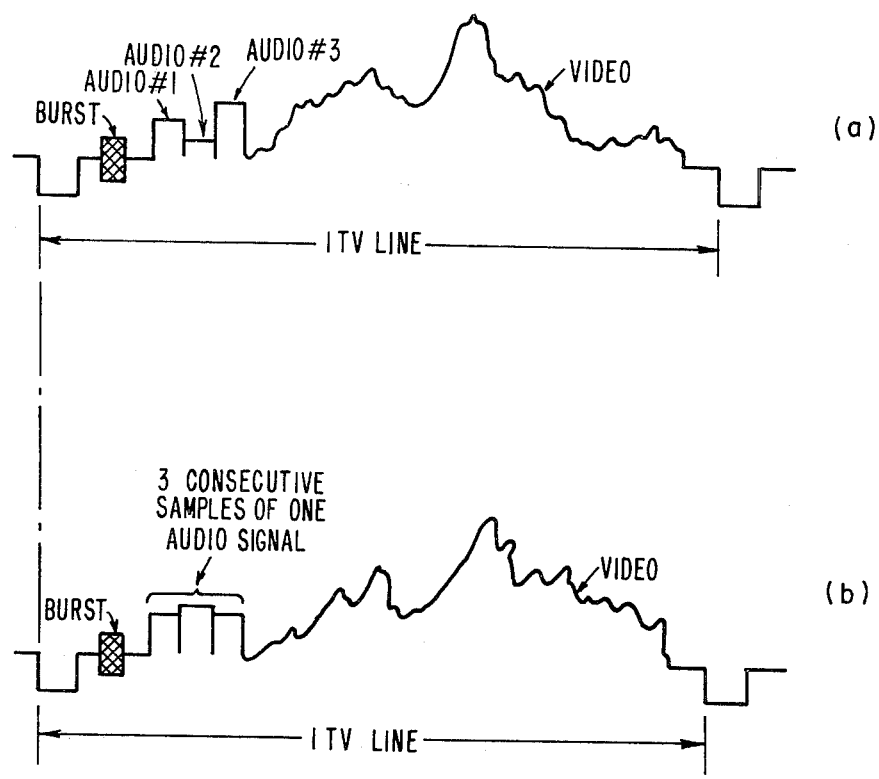
FIG. 7 shows with curves two modes of inserting three audio samples into a video line.

The crosstalk problem can be avoided by the format indicated by curve (b) of FIG. 7. Here each active TV line carries three consecutive samples (for a three-channel system) of only one of the audio signals. This format can be produced by using a pseudo-random address to locate the first sample in the RAM and then following it with the next two samples in sequence.

With this format, any crosstalk between samples is equivalent to a small reduction in bandwidth and will not effect intelligibility. This is true for crosstalk caused by timing errors in the descrambler as well as for signal transient effects. If, for example, eight video samples are integrated in the descrambler to form one audio sample, a timing error might result in six video samples from one of the input audio pulses being added to two video samples from an adjacent audio pulse. Since contiguous samples are usually similar in amplitude, this crosstalk would have little effect except for some attenuation of the highest audio frequencies.

There are different ways in which the audio samples can be interlaced in the TV field with this format. One is simply to alternate the audio signals; that is, one active line contains three samples of audio #1; the next line, three samples of audio #2; the next line, three samples of audio #3, etc. A second way would be to divide each TV field into three audio fields; the first 80 lines carry 240 samples of audio #1, the second 80 lines carry 240 samples of audio #2, etc.

Figure 8:
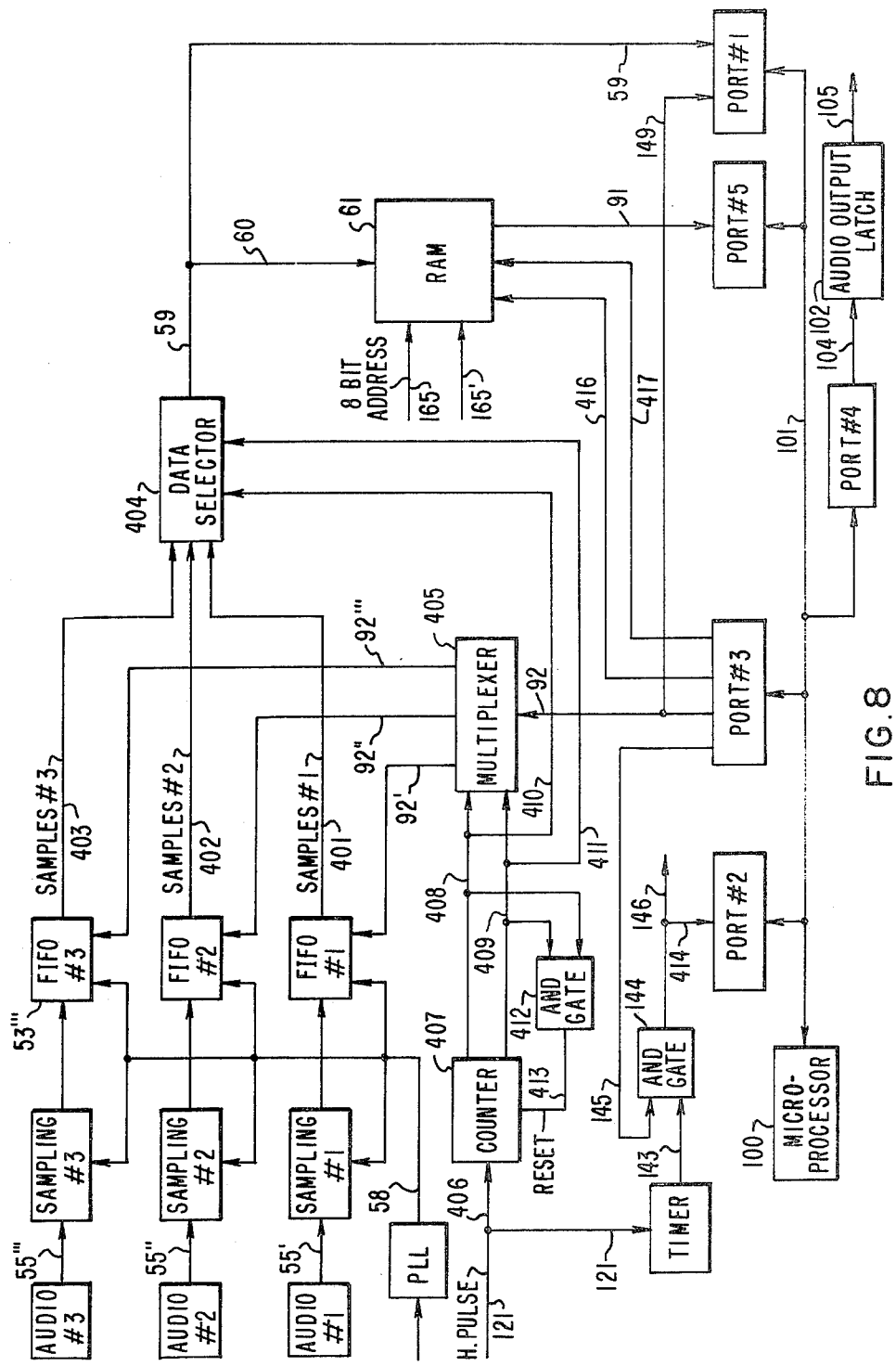
FIG. 8 shows circuitry used in the context of FIG. 7 for inserting three consecutive audio samples in one video signal where three audio sources are to be transmitted.

Referring to FIG. 8, a block diagram shows how the circuit of FIG. 2 can be modified for the insertion of three consecutive samples, with three audio sources providing three different continuous audio signals.

Figure 9:
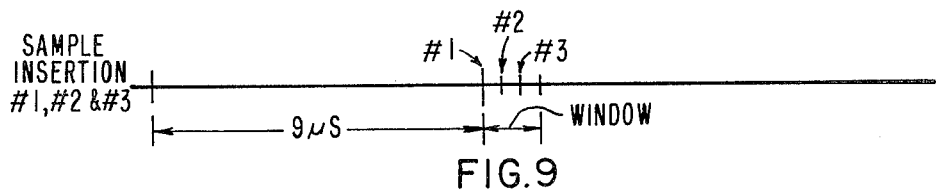
FIG. 9 shows the timing of the command signals used in FIG. 8 for the insertion of three consecutive samples.

Referring to FIG. 8, circuitry is shown for storing audio samples into RAM 61 from three different audio sources, Audio #1, Audio #2 and Audio #3, and for deriving three consecutive samples of each audio source after scrambling into RAM 61, each triplet of samples being inserted in an occurring video line after latching into audio output latch 102 and when insertion is triggered by line 146. Only relevant portions of the circuitry of FIG. 2 have been shown in FIG. 8. All circuit elements relative to the timer section have been, for the sake of clarity, represented by one block responsive to the H-pulse of line 121 and outputting the proper 9 microsecond delayed signal on line 143 to AND Gate 144. The microprocessor is shown with the data bus 101 and all its Ports. The distinctive portions are as follows:

The three audio sources are sampled by respective sampling circuits, each equivalent to the combination of sample and hold circuit 51 and A/D converter 52 of FIG. 2. The sample clock contains the phase locked loop PLL and is the same as in FIG. 2, being common to the three audio channels. This clock also controls three F1F0 circuits 53', 53" and 53"' which are the same as circuit 53 of FIG. 2. A data selector 404 derives three consecutive samples from the F1F0 circuit in each successive positions corresponding to inputs 401, 402, 403, thereby to output three samples on lines 59 and 60 to Port #1 and to RAM 61 like in FIG. 2. The three positions of data selector 404 correspond to three successive video lines. These are defined by two bit lines 410, 411 from a 2-bit ring counter 407 triggered by the H-pulse. The ring counter establishes three successive states due to AND device 412 which in a feedback loop resets the counter after each succession of three states. A multiplexer 405 responds to three pulses on line 92 from the microprocessor (like in FIG. 2) to derive three control lines 92', 92", 92"' for the respective F1F0 (instead of one per video line, or H-pulse, in FIG. 2). RAM 61 has been chosen to have 204 locations capacity, thereby to allow 240 samples to be stored, or read-out, in a 256×4=1024 array with an eleven-bit address. The most significant bit (MSB) is on line 165' (line in FIG. 2), the 8-bit address defines the locations for storage or random read-out and the 2 additional bits are in fact the least significant bits used to identify the three consecutive samples of the current video line. Insertion of the first sample takes place automatically when by line 146 the window is initiated. The microprocessor knows starting of the window nine microseconds from the H-pulse (see FIG. 9) by line 414 from line 146 to Port #2 and, therefore, it can clock twice more, by the bits of lines 165, 165', the insertion of two more samples (see again the window for insertion shown in FIG. 9).

Additional secure audio channels can be provided by using parallel single-channel circuit boards. The only changes required are those required for the changed scrambler output signal format and for the descrambler input signal format. Most of these changes could be made in the instruction sequences controlling the 8×300 microprocessors.

A two-channel audio capability can be provided by time-sharing the single-channel circuitry. The analog-to-digital converter and digital-to-analog converter both are capable of operating at more than twice the current speed and could therefore be time-shared. The random access memory has exactly the capacity required for two audio channels. Both channels could use the same pseudo-random addressing. In this regard, it is assumed that the 8×300 microprocessor is fast enough to process two audio signals in each TV line period. It is therefore possible to have a two-channel audio capability with a negligible increase in circuitry.

The audio scrambler/descrambler according to the invention offers a channel bandwidth which is twice that of commercial audio scramblers and the degree of security attained is extremely high. The number of different sequences of audio samples that are possible in each TV field period is 240 factorial, or $4 \times 10^{486}$, a number so large that it effectively eliminates trial and error decoding. At the same time, the spectrum of the scrambled signal resembles that of random noise, so that neither time domain or frequency domain analysis appear to provide useful information for unauthorized decoding.

APPENDIX

8×300 Microprocessor Programs

The microprocessor instruction sequence for the audio scrambler of FIG. 2 is listed in Table 3, and for the descrambler of FIG. 6 is listed in Table 4. Details of the instruction set and the microprocessor architecture are given in Chapter "Microprocessor" pages 61–72 of the Signetics Data Manual (copyright 1976, Signetics Corporation, 811 East Arques Avenue, Sunnyvale, Calif. 94086). Reference to one of these is essential for understanding the instructions.

The code in the tables is 6-digit octal, but in the binary code used in the equipment the 2nd and 5th most significant octal digits are represented in binary code by only 2 bits. This results in 16-bit instructions. For example, Table 1, Code 9 in octal and binary is as follows:

| 6-Digit Octal: | 5 | 22 | 1 | 13 |
|---|---|---|---|---|
| 16-Digit Binary: | 101 | 10010 | 001 | 01011 |

The fourth column of the tables lists the 8-bit port that is involved in the operation specified by the instruction. There are five ports, denoted P1 to P5, with P1, P2, and P5 assigned to the "left bank" and P3 and P4 assigned to the "right bank". One port in each bank can be selected, that is, made active, at a time. The active port in each bank stays active until another port in the same bank is selected.

The eight individual input-outputs of each port are labeled 0, 1, 2, 3, 4, 5, 6, and 7. The notation P3, 7 refers to the seventh position of P3. The functions of the scrambler ports are listed in Table 1, and those of the descrambler ports, in Table 2.

TABLE 1
SCRAMBLER PORTS

| P1 | | < | | 8 MSB from F1FO P1, 7 is LSB |
|---|---|---|---|---|
| P2 | 0 | | | |
| | 1 | < | | Beginning of line |
| | 2 | < | | Vertical Interval |
| | 3 | < | | F1FO data ready |
| | 4 | | | |
| | 5 | | | |
| | 6 | < | ⎫ | 2 LSB from RAM |
| | 7 | < | ⎭ | |
| P3 | 0 | > | | Latch multiply code |
| | 1 | > | | Clock Sequential Counter & Write Enable to address RAMS |
| | 2 | > | | Insert Audio Enable |
| | 3 | > | | Latch output data |
| | 4 | | | |
| | 5 | | | |
| | 6 | > | | Write Enable to RAM and Start Address Search |
| | 7 | > | | F1FO clock, Port 1 B1C signal |
| P4 | | > | | 8-bit output data to latch, 3-bit multiply code to latch |
| P5 | | < | | 8 MSB from RAM |

TABLE 2
DESCRAMBLER PORTS

| P1 | | < | | 8-bit input data from Input F1FO P1, 7 is LSB |
|---|---|---|---|---|
| P2 | 0 | < | | Random Address search in progress |
| | 1 | < | | H. Pulse (beginning of line) |
| | 2 | < | | Vertical interval |
| | 3 | < | | F1FO data ready |
| | 4 | < | | Multiply code ready |
| | 5 | < | ⎫ | |
| | 6 | < | ⎬ | 3-bit multiply code |
| | 7 | < | ⎭ | |
| P3 | 0 | > | ⎫ | 2 LSB to RAM |
| | 1 | > | ⎭ | |
| | 2 | > | | |
| | 3 | > | | Start random address search |
| | 4 | > | | Load Output F1FO |
| | 5 | > | | Clock Sequintial Counter |
| | 6 | > | | Load RAM |
| | 7 | > | | F1FO Clock, Port #1 BIC Signal |
| P4 | | > | | 8 MSB to RAM |
| P5 | | | | not used |

TABLE 3
SCRAMBLER 8 X 300 PROGRAM

| Address | Description | Code | | | | Port |
|---|---|---|---|---|---|---|
| 0 | NOP | 0 | 00 | 0 | 00 | |
| 1 | NOP | 0 | 00 | 0 | 00 | |
| 2 | NOP | 0 | 00 | 0 | 00 | |
| 3 | O > AUX | 6 | 00 | 0 | 00 | |
| 4 | SEL. P3 | 6 | 17 | 0 | 03 | 3 |
| 5 | AUX > P3 | 0 | 00 | 0 | 37 | 3 |
| 6 | SEL. P2 | 6 | 07 | 0 | 02 | 2 |

TABLE 3-continued

SCRAMBLER 8 X 300 PROGRAM

| Address | Description | Code | | | | Port |
|---|---|---|---|---|---|---|
| 7 | NZT (B.Line) 9 | 5 | 21 | 1 | 11 | 2 |
| 8 | JMP 191 | 7 | 00 | 5 | 37 | |
| 9 | NZT (Vert.Int.) 11 | 5 | 22 | 1 | 13 | |
| 10 | JMP 12 | 7 | 00 | 0 | 14 | |
| 11 | MJP 159 | 7 | 00 | 4 | 37 | |
| 12 | NZT (Data Rdy) 14 | 5 | 23 | 1 | 16 | 2 |
| 13 | JMP 159 | 7 | 00 | 4 | 37 | |
| 14 | SEL. P3 | 6 | 17 | 0 | 03 | 3 |
| 15 | Clock F1FO | 6 | 37 | 1 | 01 | 3 |
| 16 | NOP | 0 | 00 | 0 | 00 | |
| 17 | $\overline{\text{Clock F1FO}}$ | 6 | 37 | 1 | 00 | 3 |
| 18 | NZT (B.Line)18 | 5 | 21 | 1 | 22 | 2 |
| 19 | W.E. > RAM: R.Addr.Start | 6 | 36 | 1 | 01 | 3 |
| 20 | $\overline{\text{W.E.}}$ > RAM | 6 | 36 | 1 | 06 | 3 |
| 21 | Sel. P1 | 6 | 07 | 0 | 01 | 1 |

The meanings of the terms in the Description column of Tables 3 and 4 are explained by the following examples. The notations R3, R4, R6, etc., refer to 8-bit internal registers in the microprocessor:

| | |
|---|---|
| NOP | No operation |
| AUX | Internal register. Contains second term for all arithmetic operations. |
| SEL.P3 | Select port 3 |
| NZT (B.Line) 9 | Non-zero transfer: If Beginning of Line Signal is present, jump to address 9, else advance to next address in sequence. |
| JMP 191 | Jump to decimal address 191 |
| 101B > R4 | Load binary 101 in internal register R4 |
| Clock F1FO | Output a logical 1 to the F1FO |
| $\overline{\text{Clock F1FO}}$ | Output a logical o to the F1FO |
| XEC (Mult.Code)+1 | Execute instruction at address given by the sum of the multiply code, the current address, and 1. |
| Add R1, 4 > R3 | Cyclicly shift contents of internal register R1 four positions to the right, add to AUX, and place in internal register R3. |
| 111B > P4, 7 | Place 111 binary in port 4 with least significant bit in position 7 of the port. |
| P4,7,5 > R6 | Move 5 bits from port 4 with LSB from position 7, into R6. |
| XOR P1,7,0 > R3 | Exclusive-OR 8-bits of port 1 (position 7 is LSB) with content of AUX and place in R3. |

I claim:

1. In a television system transmitting on a line-per-line basis a plurality of video signals during regular periodical time intervals, an audio scrambler apparatus for securely transmitting at least one continuous audio signal with said television system comprising:
means for sampling said audio signal during successive said periodical time intervals to derive a predetermined number of audio samples;
means for scrambling said derived audio samples to derive scrambled audio samples; and
means operative on a line-per-line basis for inserting at least one derived scrambled audio sample into a selected portion of a video signal for transmission therewith by said television system;
an audio unscrambler apparatus responsive to the transmitted video signals comprising:
means responsive to the successively received video signals for extracting during one said regular periodical time interval successive received audio samples;
means for unscrambling said received audio samples in accordance with a pattern which is reverse of the processing pattern of said scrambling means;
means responsive to said unscrambled audio samples to form a continuous signal during an associated one of said regular periodical time intervals;
means for deriving with said audio samples an indication of the mean value thereof and of the deviations thereof in magnitude from such mean value;
means for determining a multiplier coefficient applicable to all of said derived audio samples;
means for multiplying said deviations by said multiplier coefficient and for adding said mean value to provide amplified audio samples;
the amplified audio samples being transmitted as said inserted audio samples together with an indication of said multiplier coefficient and said mean value;
with the audio unscrambler apparatus including:
means responsive to the received audio samples and to said indication relative to said multiplier coefficient and mean value for determining deviations of said amplified samples from said means value and for dividing said deviations by said multiplier coefficient to provide an audio sample which is substantially the same as with the original audio signal whereby the transmission reception over said communication channel is free from noise.

2. Apparatus for inserting scrambled audio samples in a television system on a line-per-line basis by insertion of at least one audio sample in a selected time portion of an active television line; comprising:
a main random-access-memory (RAM) device for storing audio samples in a sequence as received in the Write mode of said main RAM device, and for deriving scrambled audio samples to be inserted from said RAM device in the Read mode;
a pseudo-random generator for generating pseudo-random addresses;
a counter responsive to said pseudo-random generator for storing a generated pseudo-random address as an initial counter state;
said main RAM device using a generated pseudo-random address from said counter when in the Read mode under time control in relation to said selected time portion of an active video signal;
auxiliary random access memory (RAM) means responsive to said counter for indicating in different storing locations use by said main RAM device for all pseudo-random addresses derived from said counter;
means for comparing a new pseudo-random address with every indication of a used pseudo-random address in said auxiliary RAM means to detect any repetition between new and used pseudo-random addresses;
said counter being advanced sequentially to a subsequent counter state when a repetition is detected;
with said comparing means being operative in relation to a television line during another time interval thereof than said selected time portion for insertion;
whereby every new pseudo-random address is checked for omission and repetition by said comparing means within a time interval representing the duration of a television line before being used by said main RAM device in the Read mode.

3. The apparatus of claim 2 with said auxiliary RAM means comprising a first and a second auxiliary RAM device;

said counter being operative with both said first and second auxiliary RAM devices;

said comparing means being operative with one of said first and second auxiliary RAM devices, alternately, each in relation to one alternative television line, the other being erased at the same location for which said one auxiliary RAM device has an indication registered of the use of the associated pseudo-random address by said main RAM device.

4. The apparatus of claim 2 with said audio samples being associated with a selected grouping of television lines for insertion;

with said auxiliary RAM means having at least as many locations as said groupings;

with said counter and comparing means being actuated at a frequency rate which is larger than the television line rate multiplied by the number of television lines per grouping.

* * * * *